United States Patent
Sliva (10) Patent No.: US 7,949,363 B2
(45) Date of Patent: May 24, 2011

(54) METHODS AND SYSTEMS FOR EFFICIENT CONVEYANCE OF BANDCLASS INFORMATION IN WIRELESS NETWORKS

(75) Inventor: Vladimir Petr Sliva, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 792 days.

(21) Appl. No.: 11/145,392

(22) Filed: Jun. 3, 2005

(65) Prior Publication Data
US 2006/0274640 A1 Dec. 7, 2006

(51) Int. Cl.
*H04M 1/00* (2006.01)
(52) U.S. Cl. .......... 455/552.1; 455/432.1; 455/436; 455/439
(58) Field of Classification Search .......... 455/432.1, 455/434, 435.2, 450, 452.1, 436–439, 552.1
See application file for complete search history.

(56) References Cited

U.S. PATENT DOCUMENTS

| | | | |
|---|---|---|---|
| 6,542,752 B1* | 4/2003 | Illidge | 455/458 |
| 6,687,237 B1* | 2/2004 | Lee et al. | 370/331 |
| 6,721,562 B2* | 4/2004 | Kelley | 455/434 |
| 6,917,810 B2* | 7/2005 | Julka et al. | 455/439 |
| 7,437,165 B2* | 10/2008 | Burgess et al. | 455/450 |
| 2004/0266445 A1* | 12/2004 | Burgess et al. | 455/450 |
| 2006/0276192 A1* | 12/2006 | Dutta et al. | 455/436 |

OTHER PUBLICATIONS

ANSI/TIA-41.540-E-2004, TIA Standard Part 540: Wireless Radiotelecommunications Intersystem Operations—MAP Operations Signaling Protocols, Apr. 2004, pp. 83-92, 113-114, and 125-128.
ANSI/TIA-41.550-E-2004, TIA Standard Part 550: Wireless Radiotelecommunications Intersystem Operations—MAP Parameters Signaling Protocols, Apr. 2004, pp. 78-81, and 245-247.
TR-45, PN-3590-550, MAP Parameters Signaling Protocols, pp. 83-85.

* cited by examiner

*Primary Examiner* — Tuan H Nguyen
(74) *Attorney, Agent, or Firm* — Fay Sharpe LLP (57) ABSTRACT

Systems and methods are presented for efficiently conveying bandclass information between switching modules in a wireless communications system to facilitate call delivery or call origination. A compact bandclass information field is provided in inter-system paging and other non-handoff messages, in which each of a plurality of field bits indicates whether a particular bandclass is supported by a given mobile communications unit, thereby providing bandclass support information in an efficient manner to a recipient switching module.

15 Claims, 10 Drawing Sheets

METHODS AND SYSTEMS FOR EFFICIENT CONVEYANCE OF BANDCLASS INFORMATION IN WIRELESS NETWORKS

FIELD OF THE INVENTION

The present invention relates to telecommunications in general, and more particularly to systems and methods for conveying bandclass information in wireless communications networks in an efficient manner.

BACKGROUND OF THE INVENTION

Mobile communications units, such as cell phones, pagers, personal communication service (PCS) units and the like, have become common in modern society, allowing users to send and receive calls, faxes, pages, messages, etc. to or from practically any location in the United States and throughout much of the world. Such mobile devices are operated for wireless communication according to various standards with respect to modulation techniques, for example, Advanced Mobile Phone Service (AMPS) for analog technology, and Code Division Multiple Access (CDMA) or Time Division Multiple Access (TDMA) for digital technology, in order to provide communications services including calls, messages, or exchange of data or information, whether analog or digital, wherein such communications can be transmitted to or received from a wireless unit, whether a stand-alone unit or integrated within a larger system.

Mobile units communicate with system components, such as transceivers associated with system base stations, at various radio frequencies according to a given standard, where the popular combinations of frequency and standard (e.g., modulation scheme) are referred to as bandclasses. Many different bandclasses have been defined, with certain mobile communications units being capable of communicating on (i.e., supporting) several different bandclasses. Examples of such bandclasses include CDMA 800 MHz channel (Band Class 0), AMPS 800 MHz channel, NAMPS 800 MHz channel, CDMA 1900 MHz channel (Band Class 1), TACS channel (Band Class 2), JTACS channel (Band Class 3), Korean PCS channel (Band Class 4), 450 MHz channel (Band Class 5), 2 GHz channel (Band Class 6), 700 MHz channel (Band Class 7), 1800 MHz channel (Band Class 8), 900 MHz channel (Band Class 9), and a secondary 800 MHz channel (Band Class 10). More bandclasses are being defined all the time, and capability of mobile units to support many different bandclasses is increasing. Support for multiple bandclasses by mobile units and network components allows adaptation of communications traffic and bandclass resource allocation to facilitate load balancing in the system while minimizing call drops. In this regard, if a particular mobile device is only capable of communication on a single defined bandclass, the availability of services resources for that unit is limited by current usage of that particular bandclass in a given area, wherein services may be temporarily unavailable to the user if the supported bandclass is currently fully allocated.

Wireless communications systems and networks have been constructed and interconnected with wire-based telecommunications systems such as the pre-existing public switched telephone network (PSTN) to allow mobile devices to communicate with other mobile devices as well as with ordinary stationary telephones. Standardized protocols have been developed for messaging between various system components, such as the Telecommunications Industry Association/Electronic Industries Association (TIA/EIA) standardized intersystem operations protocol ANSI-TIA/EIA 41-D (IS-41), published by the American National Standards Institute (ANSI), and the GSM Mobile Application Part (MAP) protocol, a publication of the European Telecommunications Standards Institute (ETSI). Wireless systems include various infrastructure to service a wide geographic area divided into "cells" with base stations serving one or more such cells and networked mobile switching centers (MSCs) serving one or more base stations, where the MSCs are operatively coupled with one another and other systems by a wireless network and one or more MSCs may be coupled to a wire-based network to provide communications among and between wireless and/or wireline devices. To place a call, a user of a particular mobile communications unit interfaces with a base station serving the area in which the mobile unit is currently located, and the base station transmits the call to a corresponding MSC. The MSC, in turn, further routes the call as needed through the network and possibly to and/or through a wire-based system (PSTN) to connect the call with the proper destination. When an incoming call is placed to a mobile unit, for example, from a wireline telephone, the calling party initially dials the mobile unit number, and the call is routed through the PSTN, other networks, and/or wireless communications systems until the communication reaches the MSC serving the called party's mobile unit, which then connects the call to the mobile unit.

One important feature of mobile communications devices is the ability to send or receive communications regardless of the location of the mobile unit. Moreover, although a particular service provider or carrier provides wireless communications services to a given mobile unit, services are provided via other carriers when the user moves outside the areas specifically served by his or her service provider. In particular, if the new location of the mobile unit (a "visited" area) is serviced by a different carrier, the subscriber is said to be "roaming" out of the home service area. The various carriers have agreed to follow certain procedures in processing communications of each other's subscribers, wherein the service provider operating in the visited area validates roaming subscribers. When a mobile communications unit moves away from the associated home MSC, moreover, the serving or border MSC associated with the new location may need to know the bandclasses that the mobile unit is capable of supporting, in order to perform intelligent resource allocation and load balancing. Supported bandclass information is also desirable during visitor registration and/or updating of profile information for a registered visiting mobile unit.

Mobile devices typically do not convey bandclass information in an origination or page response message to a border or serving MSC. However, the receipt of one of these two messages at the serving or border MSC is an opportune time for that MSC to inform the mobile unit whether the unit's preferred bandclass could be used, or alternatively whether the mobile must use the bandclass on which it is currently accessing the system. In this regard, if the border MSC is currently unable to provide service on the current bandclass (the latest bandclass used by that mobile unit) and is unaware of the bandclasses supported by the mobile unit, the call may be dropped, even though the mobile supports another bandclass that is currently available. The current ANSI (IS-41) wireless protocol provides several messaging mechanisms by which border or serving MSCs may be provided with bandclass information. For instance, a serving MSC may send supported bandclass along with other information from an associated Visitor Location Register (VLR) record to a border MSC using an IS41 InterSystemPage (ISPAGE) or InterSystemPage2 (ISPAGE2) invoke message, and the border MSC then pages the mobile unit. As shown in the ANSI standards TIA-41-540-E and TIA-41-550-E, incorporated herein by reference, the ISPAGE and ISPAGE2 invoke messages can include an optional CDMABandClassList parameter that includes the bandclasses that the mobile supports. Having this information advantageously allows the border MSC to select one of the supported bandclasses for use by the mobile for a particular call based on current bandclass allocation in the area serviced by the border MSC. The CDMABandClassList parameter is also used for registering visiting mobiles in a serving MSC's area (e.g., in an IS-41 RegistrationNotification (REGNOT) return result message), as well as for updating profile information from the home to the visited MSC (using an IS-41 QualificationDirective (QUALDIR) invoke message).

However, REGNOT return result and the QUALDIR, ISPAGE, and ISPAGE2 invoke messages, and the CDMABandClassList parameter thereof, are relatively large, wherein transmission of these invoke messages occupies significant system resources. In particular, the CDMABandClassList parameter requires several octets (8 bits each) for each supported bandclass being reported in the above messages. Furthermore, as more and more bandclasses are to be supported, the CDMABandClassList parameter can potentially become huge if the mobile communications unit supports many different bandclasses. As discussed above, omitting the bandclass information from these messages inhibits the ability to perform load balancing, may lead to unnecessary call drops, and generally results in suboptimal system functionality. Accordingly, there remains a need for improved methods and systems for efficiently conveying bandclass information in wireless networks for purposes of delivering a terminating call or originating a call.

SUMMARY OF THE INVENTION

A summary of one or more aspects of the invention is now presented to facilitate a basic understanding thereof, wherein this summary is not an extensive overview of the invention, and is intended neither to identify certain elements of the invention, nor to delineate the scope of the invention. Rather, the primary purpose of the summary is to present some concepts of the invention in a simplified form prior to the more detailed description that is presented hereinafter. The invention relates to systems and methodologies for efficient conveyance of bandclass support information between mobile switching centers or other switching modules, or the home or visitor location registers associated therewith for purposes of delivering a terminating call or of call origination, using messages having a bandclass indicating field with individual bits indicating support by a given mobile communications unit or device for one or more bandclasses in a wireless communications system. The invention may be implemented using a revised or modified ANSI-41 standard, allowing more efficient encoding of mobile supported bandclasses in messages like ISPAGE invoke, ISPAGE2 invoke, QUALDIR invoke, and REGNOT return result, in order to benefit cell load balancing and thus maximize wireless system utilization while reducing the number of dropped calls and increasing revenue.

One aspect of the invention relates to a method of conveying or transferring bandclass information between first and second switching modules, such as MSCs and data stores associated therewith in an efficient manner for delivering or originating a call in a wireless communications system, using a message with a bandclass information field comprising a plurality of bits individually indicating support for a particular bandclass by a mobile communications unit. The method comprises constructing a message in a first switching module, and providing a bandclass indicating field in the message with a plurality of bits individually indicating support for a particular bandclass by a given mobile communications unit, with the message being transmitted to a second switching module via a wireless communications network to facilitate delivery or origination of a call. In one embodiment illustrated and described below, the bandclass field includes a CDMACallMode parameter, which may be anywhere in the message, with the lengthy CDMABandClassList parameter being omitted from the message, where examples of such messages used in facilitating delivery or origination of a call include ISPAGE or ISPAGE2 invoke, RegistrationNotification (REGNOT) return result, QualificationDirective (QUALDIR) invoke, or other such messages. The switching modules may be MSCs or other communications system components where it is desirable to provide bandclass support information from one switching module to another. In one example, the first switching module is a serving or anchor switching module that transmits an ISPAGE or ISPAGE2 invoke message to a border switching module to request the border module to page the mobile unit or to listen for a page response from the unit, wherein the provision of the bandclass information in compact form can significantly reduce the message size, particularly where many bandclasses are supported, while providing the information in a timely fashion to the border module to mitigate unnecessary call dropping and facilitate load balancing. In another implementation, the first switching module may be a home switching module which transmits a REGNOT return result message to a visited switching module to provide requested profile information for the mobile unit in response to a RegistrationNotification (REGNOT) invoke message from the visited module. In the case of a QUALDIR invoke message, the first module may be a home switching module constructing and transmitting the message to the visited switching module to update profile information for the mobile unit.

Another aspect of the invention provides a system for conveying bandclass information to a switching module, comprising means for constructing a message for delivery of a terminating call or origination of a call, where the message has a bandclass indicating field including two or more bits that individually indicate whether or not a given mobile communications unit supports a particular bandclass. The system further comprises means for transmitting the message to a destination switching module via the wireless communications network. The means for constructing the message may be a first switching module, such as an MSC or associated system component, wherein the bandclass indicating message field includes a CDMACallMode parameter.

Yet another aspect involves methods for conveying or transferring bandclass information between first and second switching modules in an efficient manner using a non-handoff related message with a compact bandclass information field. The method comprises constructing a non-handoff message in a first switching module, and providing a bandclass indicating field in the message with a plurality of bits individually indicating support for a particular bandclass by a given mobile communications unit. The non-handoff message is then sent to a second switching module via a wireless communications network.

BRIEF DESCRIPTION OF THE DRAWINGS

The following description and drawings set forth in detail certain illustrative implementations of the invention, which are indicative of several exemplary ways in which the principles of the invention may be carried out. Various objects, advantages, and novel features of the invention will become apparent from the following detailed description of the invention when considered in conjunction with the drawings, in which.

DETAILED DESCRIPTION OF THE INVENTION

Figure 1A:
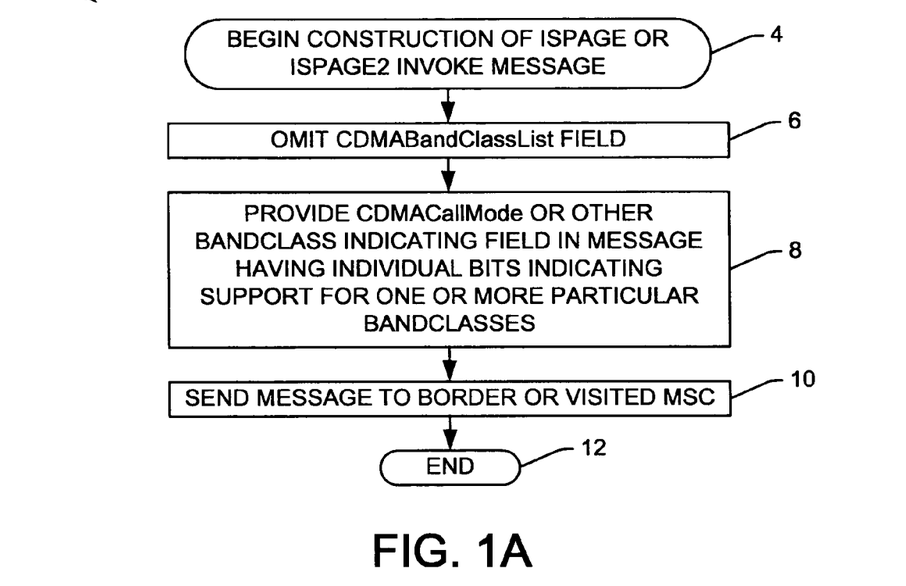
FIG. 1A is a flow diagram illustrating an exemplary method of efficiently conveying bandclass information in a wireless network in accordance with one or more aspects of the present invention.

Referring initially to FIG. 1A, one or more exemplary implementations of the present invention are hereinafter illustrated and described, wherein like reference numerals are used to refer to like elements throughout and wherein the invention is not limited to the illustrated examples. While illustrated and described below in the context of particular wireless telecommunications networks and systems, the invention finds utility in association with any type of communications apparatus and systems. The various aspects of the invention relate to systems and methods for transfer of bandclass information between switching modules in an efficient manner using non-handoff related messages having bandclass fields with individual bits that indicate support in a given mobile communications unit for a particular bandclass in a wireless communications system.

FIG. 1A illustrates an exemplary method 2 according to the invention, in which an IS-41 ISPAGE invoke or ISPAGE2 invoke message is constructed in a serving mobile switching module (e.g., MSC) and sent to a border switching module. Although the method 2 and other methods of the invention are illustrated and described below as a series of acts or events, it will be appreciated that the methods of the invention are not limited by the illustrated ordering of such acts or events. In this regard, some acts or events may occur in different orders and/or concurrently with other acts or events apart from those illustrated and described herein, in accordance with the invention. It is further noted that not all illustrated steps may be required to implement a process in accordance with the present invention. The methods of the invention, moreover, may be implemented in association with the illustrated communications systems, messages, and apparatus, as well as with other systems and non-handoff related messages not illustrated or described, wherein all such alternatives are contemplated as falling within the scope of the invention and the appended claims. For instance, the exemplary method 2 of FIG. 1A may be implemented in the system 102 of FIG. 2A below or in other systems not illustrated or described herein.

As shown in FIG. 1A, the ISPAGE or ISPAGE2 invoke message construction begins at block 4, with a CDMABandClassList parameter optionally being omitted at 6 from the message, and a bandclass indicating field being provided in the message at block 8. The message field provided at 8 may be any field or collection of two or more bits, in which the binary value (e.g., logic "1" or "0") of individual bits indicate whether a particular bandclass is supported by a given mobile communications unit that is the subject of the message. In one possible implementation, the bandclass field is a CDMACallMode parameter as defined in ANSI standard TIA-41.550-E, PN-3590-550, or equivalent, having one or more octets or bytes (8 bit groupings) with individual bits indicating support by the mobile unit for certain bandclasses, where the bandclass indicating field can be substituted for the omitted CDMABandClassList parameter in the message. It is noted that current standards only employ the CDMACallMode parameter in handoff related messaging, whereas the present invention allows for use of CDMACallMode parameters or other bandclass support indicating fields having particular bandclass support information indicated in a bitwise manner in any message that is unrelated to handoff operations or situations, for example, those sent for the purpose(s) of delivering a call or originating a call, etc. The constructed ISPAGE invoke or ISPAGE2 invoke message is then sent or transmitted to a border MSC or other switching module at 10 before the method 2 ends at 12 in FIG. 1A.

Figure 2A:
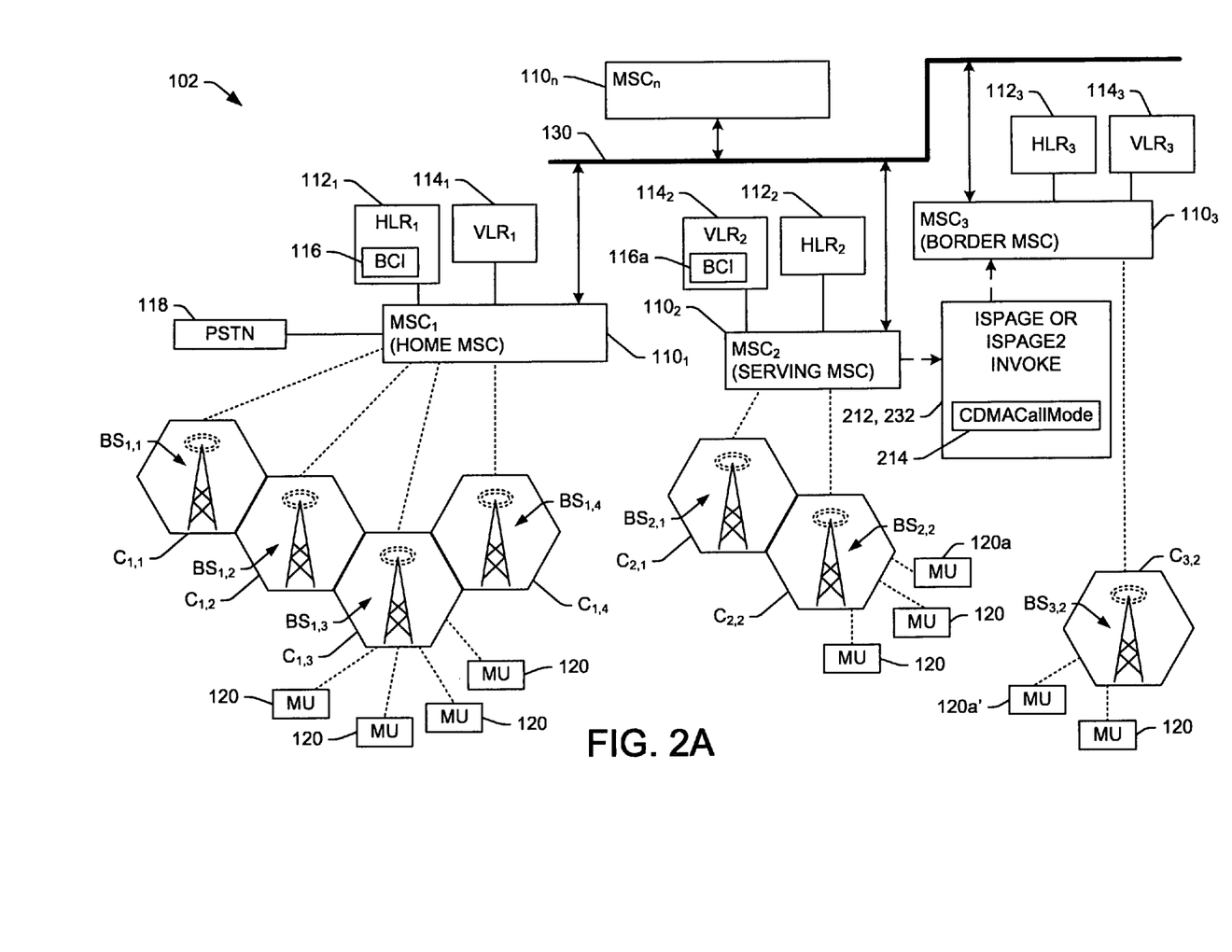
FIG. 2A is a system diagram illustrating an exemplary mobile communications system with a serving mobile switching center (MSC) conveying bandclass information to a border MSC generally according to the method of FIG. 1A in accordance with the invention.

Referring also to FIG. 2A, an exemplary mobile communications system 102 is illustrated with a serving mobile switching module (e.g., MSC) 110$_2$ conveying bandclass information regarding a mobile communications unit 120a to a border module 110$_3$ using a modified ISPAGE or ISPAGE2 invoke message 212, 232 in accordance with the method 2 of FIG. 1A. While the system 102 is illustrated as employing so-called mobile switching centers (MSCs) 110, other switching modules may be employed in a communications system of the invention, which modules can be any hardware component or components, software, or combinations thereof, and which are configured, programmed, or otherwise adapted to implement the functionality set forth herein as well as the functions of known communications system switching centers.

The MSCs 110 are operative to support communications to and from mobile communications units (MUs) 120 associated therewith, where FIG. 2A illustrates four exemplary MSCs 110, although the system 102 may comprise any integer number "n" such switching centers or modules 110 including a first MSC $110_1$, a second MSC $110_2$, a third MSC $110_3$, and an nth MSC $110_n$. The MSCs 110 may be any hardware, software, logic circuitry, etc., or combinations thereof, which are operable to implement switching functions in a communications system as are known, including but not limited to administration functions, switching functions, etc., to switch calls between cell sites C and base stations BS thereof and a network 130.

The MSCs 110, moreover, are functionally associated with individual base stations BS located in corresponding cell sites C, wherein several such cell sites $C_{1,1}$, $C_{1,2}$, $C_{1,3}$, and $C_{1,4}$ and corresponding base stations $BS_{1,1}$, $BS_{1,2}$, $BS_{1,3}$, and $BS_{1,4}$ are illustrated in FIG. 2A corresponding to the exemplary first MSC $110_1$ and similar exemplary base stations $BS_{2,1}$, $BS_{2,2}$, $BS_{3,2}$, and cell sites $C_{2,1}$, $C_{2,2}$, $C_{3,2}$ are illustrated in association with $MSC_2$ $110_2$ and $MSC_3$ $110_3$, respectively. The base stations BS offer communications interface to mobile communications units or mobile units 120 (labeled as MU in the figure), which can be cell phones or any type of mobile and/or wireless communication devices.

The MSCs 110 are operatively connected to a network 130, which may be an ANSI-41 wireless network, and one or more MSCs (e.g., home MSC $110_1$ in FIG. 2A) may be connected or connectable to provide an interface between a public switched telephone network (PSTN) 118 and the wireless system 102 and/or other wire-based or wireless networks (not shown). The MSCs 110, moreover, are individually associated with corresponding home location registers (HLRs) 112 operating as a database of mobile subscriber information for a wireless carrier's network, which may provide a data store with the necessary information for identifying and authenticating users, matching phones, phone numbers, user accounts, service plan information, etc., and which may also provide information related to the location of individual associated customer communication devices 120 within a carrier's network, (or another carrier's network if roaming), by which incoming calls can be routed through the proper base station BS. With respect to a mobile device 120 visiting within a coverage area associated with a given MSC 110, the MSCs are also operatively associated with a corresponding visitor location register (VLR) 114 for tracking visiting mobile unit identity and corresponding home switching center, by which the visited MSC 110 (e.g., MSC $110_2$ in the illustrated example) can accommodate provision of appropriate communication services to visiting mobile units 120. The MSCs 110 may also be associated with other separate databases or data stores, wherein the various databases may be distributed or integrated in any suitable fashion by which a given MSC 110 can obtain the necessary information for providing mobile communications in a defined coverage area in concert with the base stations BS.

The example of FIG. 2A shows a situation in which the various aspects of the present invention may advantageously be employed to provide for efficient transfer or conveyance of bandclass support information using modified ISPAGE or ISPAGE2 invoke messages with respect to a given mobile unit indicated in the figure as 120a. In this example, the MSC $110_1$ is the home MSC for this particular mobile unit 120a, and connects calls thereto via one of the associated base stations $BS_{1,1}$ through $BS_{1,4}$ when the mobile unit 120a is within the service area of the MSC $110_1$. The home MSC $110_1$ accesses a home location register (HLR) $112_1$ for mobile subscriber information and the current location of a mobile unit 120a, including bandclass information (BCI) 116 in $HLR_1$ $112_1$.

When the exemplary mobile unit 120a moves outside its home area and into that of $MSC_2$ $110_2$, it registers with, and is served by $MSC_2$ $110_2$ and the associated visitor location register $VLR_2$ $114_2$ ($MSC_2$ $110_2$ becomes a "serving" or "anchor" MSC in this example). Upon registration with the serving $MSC_2$ $110_2$ and $VLR_2$ $114_2$, the $VLR_2$ $114_2$ provides the home HLR $112_1$ with an indication of the current location of mobile 120a, and the HLR $112_1$ downloads subscriber information for the mobile unit 120a to $VLR_2$ $114_2$, including a copy of the relevant bandclass support information 116a. In this location, when the home $MSC_1$ $110_1$ receives a call to the mobile unit 120a, the call is delivered to the serving $MSC_2$ $110_2$, and a corresponding base station $BS_{2,2}$ pages the mobile unit 120a. If the mobile unit 120a is still in the area served by the paging base station $BS_{2,2}$, the call is completed.

Figure 3:
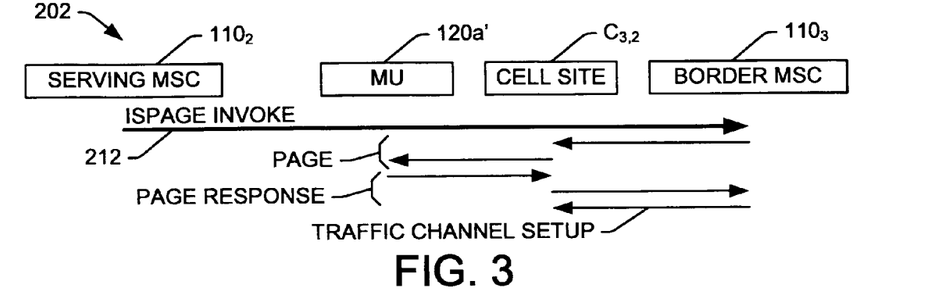
FIG. 3 is a simplified call flow diagram illustrating use of an exemplary ISPAGE invoke message to transfer bandclass information from a serving MSC to a border MSC according to the invention.

Referring also to FIG. 3, the mobile unit 120a (FIG. 2A) may have moved to an area served by a border $MSC_3$ $110_3$ (the mobile unit is accordingly shown as 120a' in FIG. 2A when at this location), without updating its registration area. FIG. 3 illustrates a simplified calling flow 202 for this case, in which case the serving or anchor $MSC_2$ $110_2$ sends an intersystem paging message 212 (ISPAGE INVOKE message 212 in this example, or an ISPAGE2 INVOKE message 232 as discussed further in FIG. 5 below) to the border MSC $110_3$ while also attempting to page the unit 120a through $BS_{2,2}$. In response to the ISPAGE invoke message 212 (including the bandclass support information 116a from VLR $112_1$ in compact form), the border $MSC_3$ $110_3$ sends a page to a corresponding base station $BS_{3,2}$ at cell $C_{3,2}$, which in turn attempts to page the mobile unit 120a' on a corresponding access (digital control) channel. When the mobile unit 120a' replies with a page response, call completion proceeds.

Figure 4A:
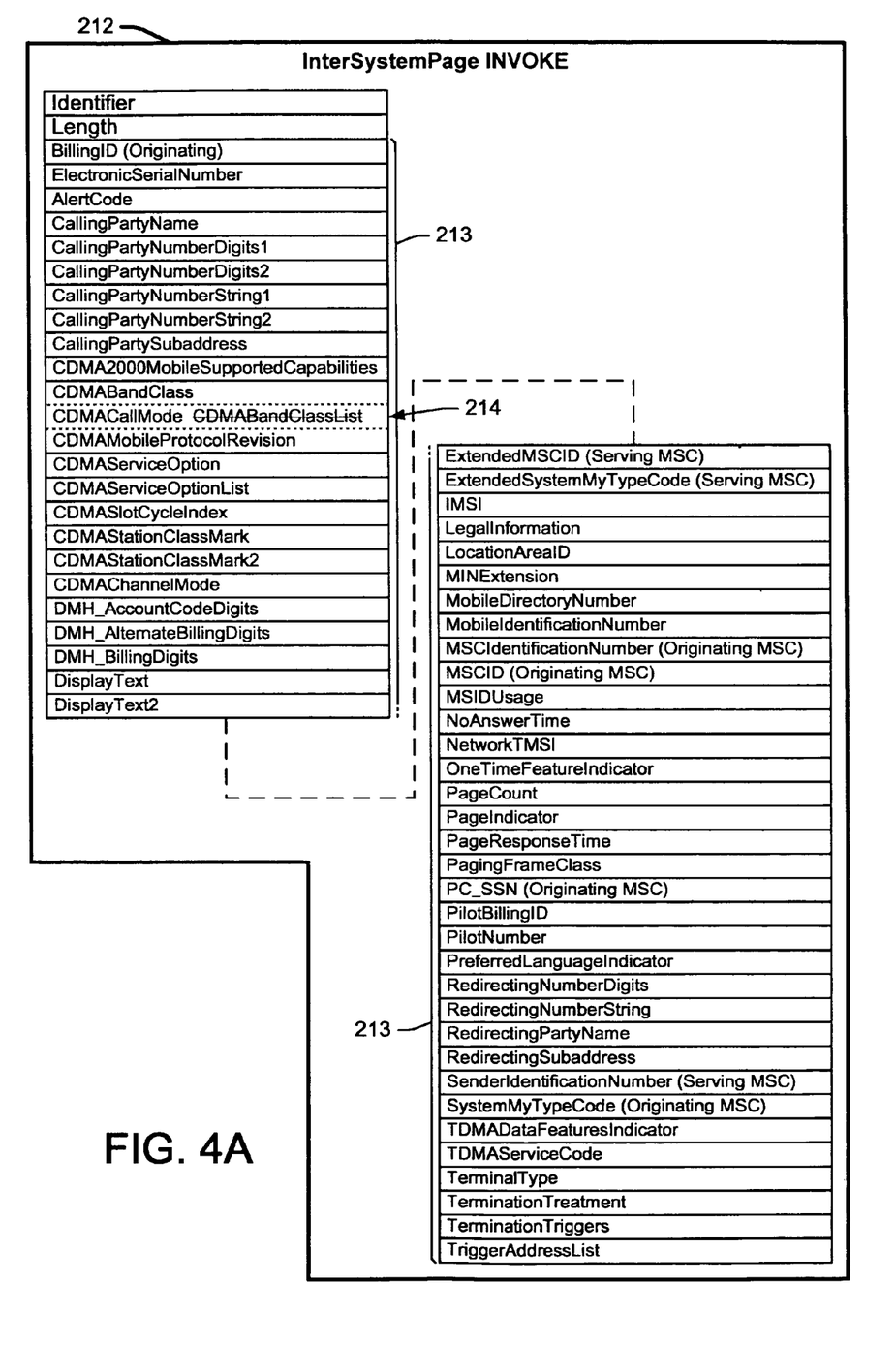
FIG. 4A is a schematic diagram illustrating an exemplary ISPAGE invoke message including a bandclass indicating field with individual bits indicating support for one or more bandclasses in accordance with the invention.
Figure 4B:
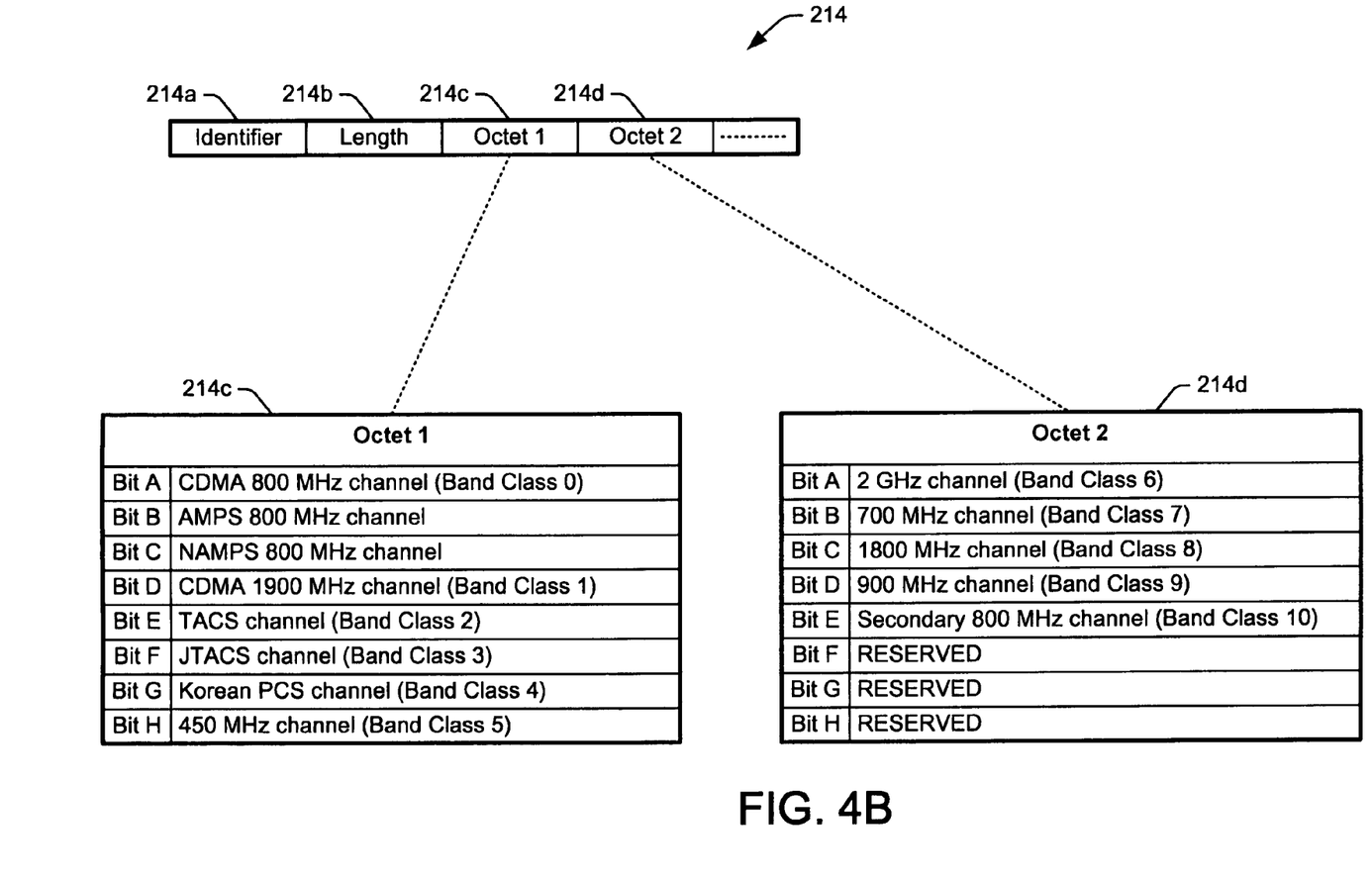
FIG. 4B is a schematic diagram illustrating an exemplary CDMACallMode parameter in the ISPAGE invoke message of FIG. 4A with two exemplary octets having individual bits indicating support for one or more bandclasses.

Referring also to FIGS. 4A and 4B, in the above described example, the serving or anchor MSC $110_2$ constructs and then sends the ISPAGE invoke message 212 using a modified format illustrated in FIG. 4A using a bandclass indicating field 214 for use by the border MSC $110_3$, generally in accordance with the method 2 in FIG. 1A above. In accordance with the invention, the field 214 is a bandclass indicating field comprising a plurality of (i.e., two or more) bits individually indicating to the recipient border MSC $110_3$ that the mobile unit 120a' supports (i.e., is able to communicate using) a particular bandclass. As discussed above, provision of this bandclass support information at this point in the call flow advantageously facilitates load balancing by the border MSC $110_3$ and reduces the likelihood that the call will be dropped. Importantly, as shown in FIG. 4B, the exemplary bandclass field 214 occupies significantly less space in the ISPAGE invoke message 212 than the previously used CDMABandClassList parameter used in conventional ISPAGE invoke messages.

In the illustrated example of FIG. 4A, the ISPAGE invoke message 212 includes an identifier field and a length field, along with a number of parameters or fields 213, generally as set forth in TIA-41-540E. However, in accordance with the invention, the exemplary bandclass field 214 is provided in the message 212. As discussed above, the field 214 can include any plurality of bits having values individually indicative of the mobile unit's capability to support a particular bandclass. In this example, the bandclass field 214 is a CDMACallMode parameter as defined in ANSI standard TIA-41.550-E, PN-3590-550, and best shown in FIG. 4B, having an identifier 214a, a length 214b, and one or more octets 214c and 214d with individual bits of the octets 214c, 214d indicating support by the mobile unit 120a' for certain bandclasses. In the exemplary CDMACallMode parameter or field 214, a single bit in a fixed position is dedicated to, or predefined to correspond to, one of the possible supported bandclass, and indicates whether the bandclass is supported by the mobile unit 120a' or not.

Thus, each additional octet in the CDMACallMode field 214 can represent 8 different bandclasses, which would be represented by at least 24 octets in the CDMABandClassList parameter (if all supported) of the conventional ISPAGE invoke message. In this regard, there are at least 14 different bandclasses currently defined, and the list has been growing, as have the capabilities of mobile units 120 to support many bandclasses. In the illustrated message 212 of FIG. 4A, moreover, the CDMACallMode parameter 214 is substituted for the omitted CDMABandClassList parameter. In this fashion, the bandclass support information is provided to the border MSC 110$_3$ at an opportune time in the call flow, and in a much more compact form than was possible using the previous ISPAGE invoke messaging, whereby system resources are conserved while facilitating improved load balancing capabilities and reducing dropped calls.

Figure 5:
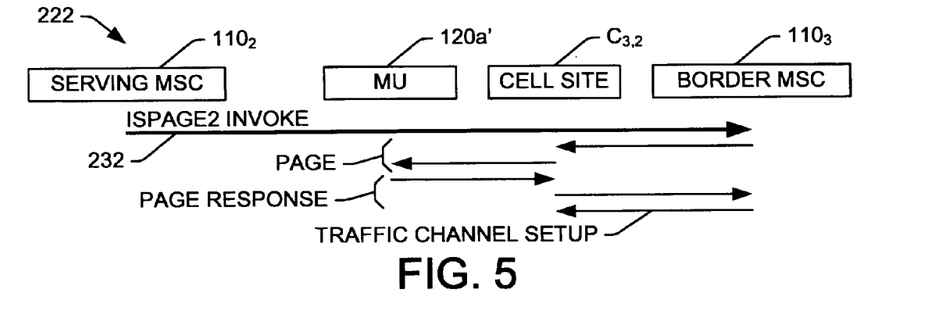
FIG. 5 is a simplified call flow diagram illustrating use of an exemplary ISPAGE2 invoke message to transfer bandclass information from a serving MSC to a border MSC according to the invention.
Figure 6:
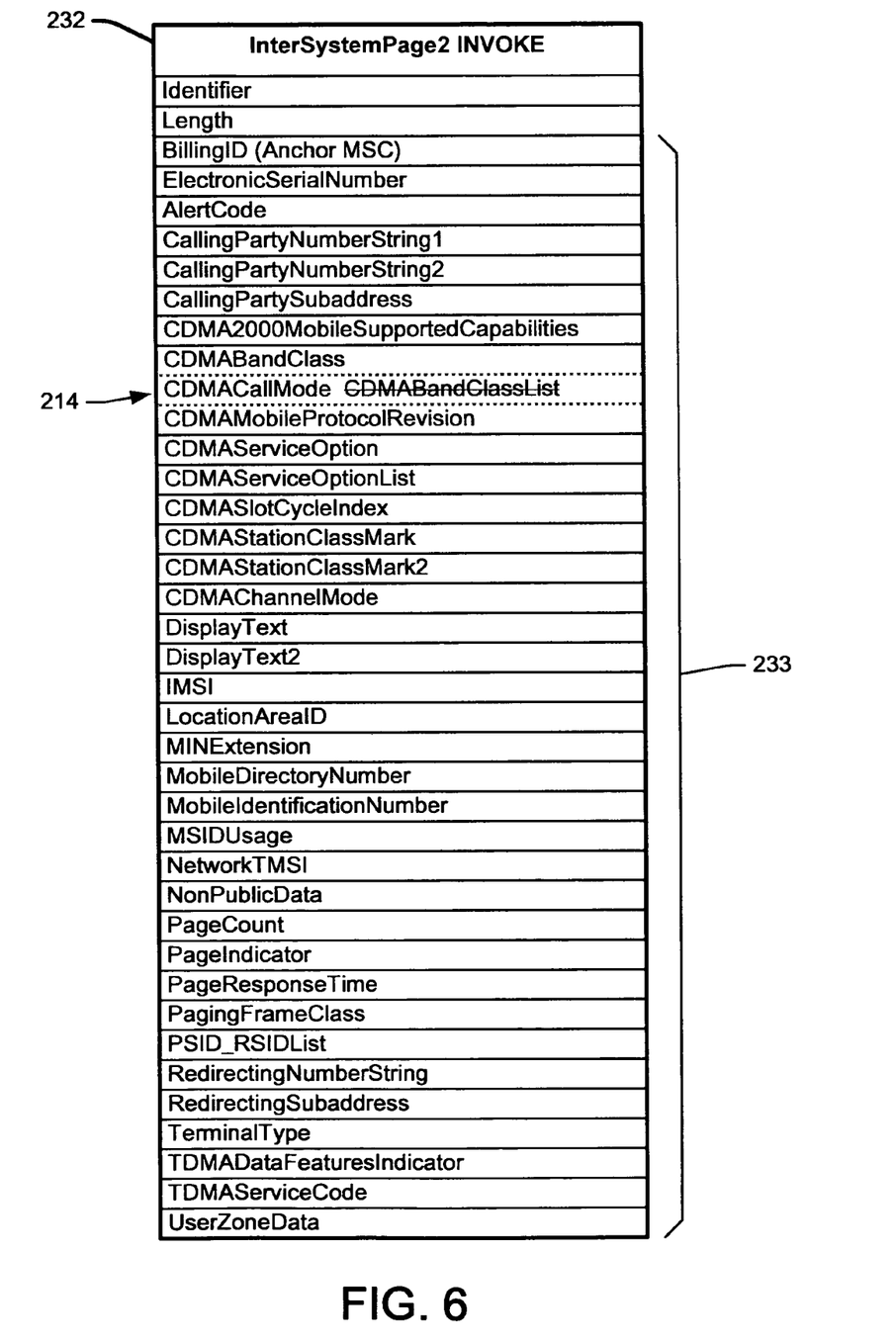
FIG. 6 is a schematic diagram illustrating an exemplary ISPAGE2 invoke message including a CDMACallMode parameter field with individual bits indicating support for one or more bandclasses in accordance with the invention.

Turning now to FIGS. 2A, 5, and 6, an alternative implementation of the invention involves construction of a modified ISPAGE2 invoke message 232 by the MSC 110$_2$, and transmission of the message 232 to the border MSC 110$_3$, according to the above described method 2 (FIG. 1A) or other suitable methodology. As shown in FIG. 6, the exemplary message 232 includes a CDMACallMode parameter 214 having bits individually identifying support or lack thereof for specific bandclasses as shown above in FIG. 4B, although any equivalent bandclass indicating field may be used in ISPAGE2 messages within the scope of the invention having such bitwise bandclass support indication. FIG. 5 illustrates a corresponding calling flow 222, wherein MSC$_2$ 110$_2$ sends an ISPAGE2 invoke message 232, in response to which the border MSC$_3$ 110$_3$ sends a page to a corresponding base station BS$_{3,2}$ (cell site C$_{3,2}$), which in turn sends a page to the unit 120a'. As described above, the mobile unit 120a' replies with a page response, and the call is completed, wherein the border MSC 110$_3$ may advantageously select the appropriate bandclass for use in association with the call according to load balancing or other considerations, using the bandclass information supplied in the ISPAGE2 invoke message 232.

Figure 1B:
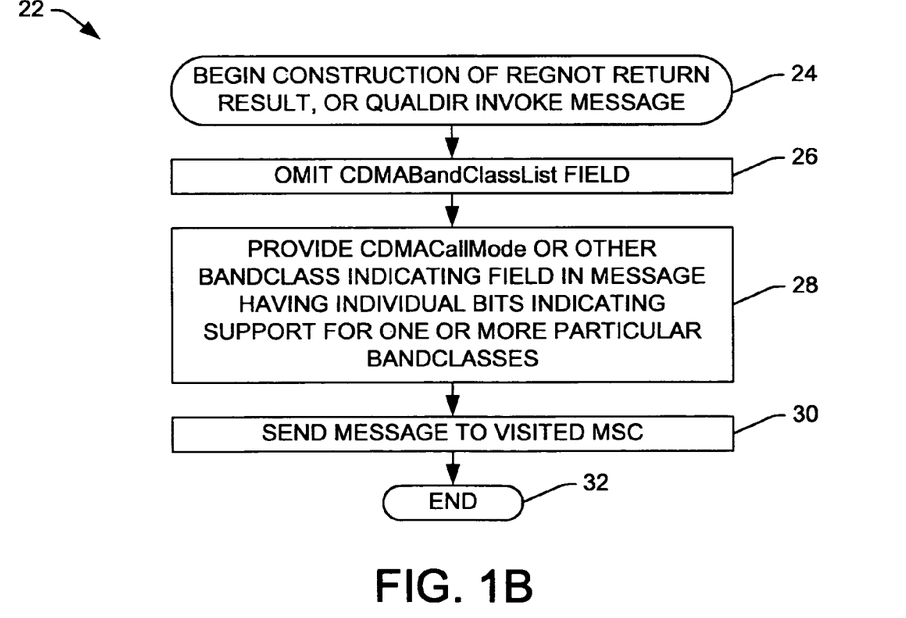
FIG. 1B is a flow diagram illustrating another exemplary method of efficiently conveying bandclass information in a wireless network according to the invention.

Referring now to FIGS. 1B, 2B, 7, 8A, and 8B, the efficient provision of bandclass indications in switching module messaging of the invention may also be employed in the context of registration notification and/or qualification directives in a wireless communications system. FIG. 1B illustrates an exemplary method 22 for providing bandclass information from a home module (e.g., MSC$_1$ 110$_1$ in FIG. 2B) to a visited module (e.g., MSC 110$_2$) or other switching module in an efficient manner using a REGNOT return result or QUALDIR invoke message that includes a bandclass information field comprising a plurality of bits individually indicating support for a particular bandclass by a given mobile unit. REGNOT return result or QUALDIR invoke message construction begins at block 24, wherein the conventional CDMABand-ClassList parameter is optionally omitted at 26, and a bandclass indicating field (e.g., CDMACallMode parameter 214 in FIG. 4B above, etc.) is provided in the message at 28. The message is then sent to a visited MSC or other switching module at 30 before the method 22 ends at block 32.

Figure 2B:
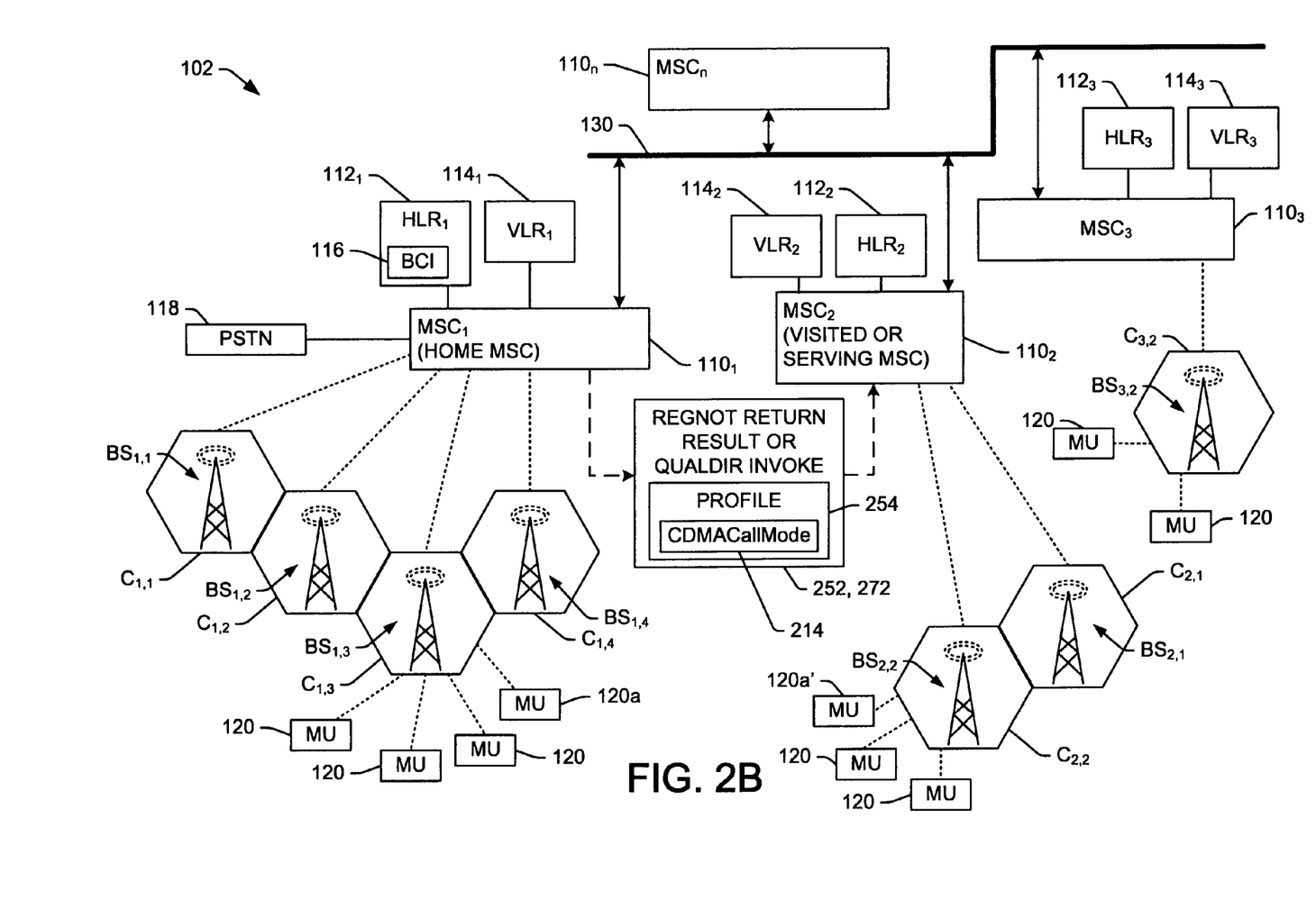
FIG. 2B is a system diagram illustrating the communications system with a home MSC providing bandclass information to a serving MSC generally according to the method of FIG. 1B according to another aspect of the invention.

Referring to the system 102 of FIG. 2B, the above method 22 is particularly useful where IS41 is used to communicate between two MSCs of a single supplier or between MSCs from different vendors for registration of a mobile unit 120a or for updating related profile information. In this regard, the conventional IS41 profile transfer messages RegistrationNotification return result and QualificationDirective invoke (e.g., from HLR 112$_1$ to the serving MSC 110$_2$ which then creates corresponding entries in the corresponding VLR 114$_2$) currently only use the inefficient CDMABandClassList within a Profile macro field, as shown in TIA-41-540-E and TIA-41-550-E. Providing the bandclass information in the more compact form in these messages facilitates load balancing by the recipient MSC, as described above, while again significantly reducing the message size. In this regard, the invention facilitates the use of a CDMACallMode parameter or other suitable bandclass indicating field 214 with two or more bits individually indicating support for a particular bandclass by a given mobile communications unit in messages where the bandclass information may be useful to the recipient switching module, and where reducing message size is desirable.

Figure 7:
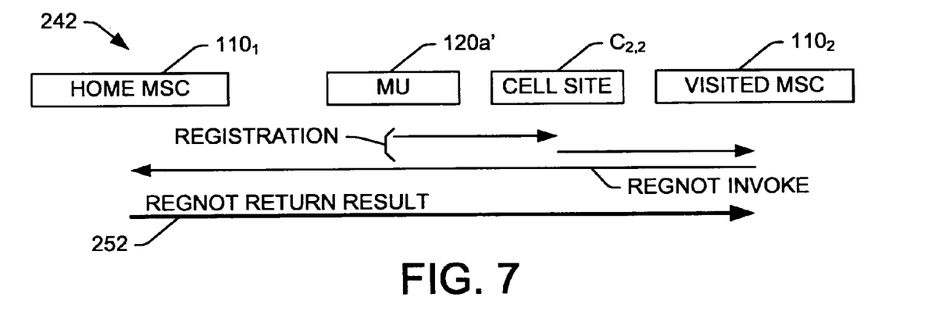
FIG. 7 is a simplified call flow diagram illustrating use of an exemplary REGNOT return result message to transfer bandclass information from a home MSC to a visited or serving MSC according to the invention.

In the situation of FIG. 2B, MSC 110$_1$ is the home MSC for mobile unit 120a, and accesses HLR$_1$ 112$_1$ for mobile subscriber information and the current location of unit 120a, including bandclass information (BCI) 116 in HLR$_1$ 112$_1$. When unit 120a moves into an area served by MSC$_2$ 110$_2$ (unit indicated as 120a' at this location in FIG. 2B), it registers with, and is served by MSC$_2$ 110$_2$ and the associated visitor location register VLR$_2$ 114$_2$. FIG. 7 provides a call flow 242 illustrating the registration process, which includes the mobile unit 120a' sending a message to cell site C$_{2,2}$ and the base station BS$_{2,2}$ thereof, which then signals the visited MSC 110$_2$. The visited or serving MSC 110$_2$ sends a RegistrationNotification invoke message (REGNOT INVOKE in FIG. 7) to the home MSC 110$_1$ to report the location of unit 120a', and optionally to validate the unit 120a' or validate the 120a' and obtain its profile information, as set forth in TIA-41-540-E. The home MSC 110$_1$ replies by transmitting the REGNOT return result message 252 to the visited switching module 110$_2$ to provide the requested profile information, including the bandclass support information 116 in the form of a CDMACallMode parameter 214 as discussed above.

Figure 8A:
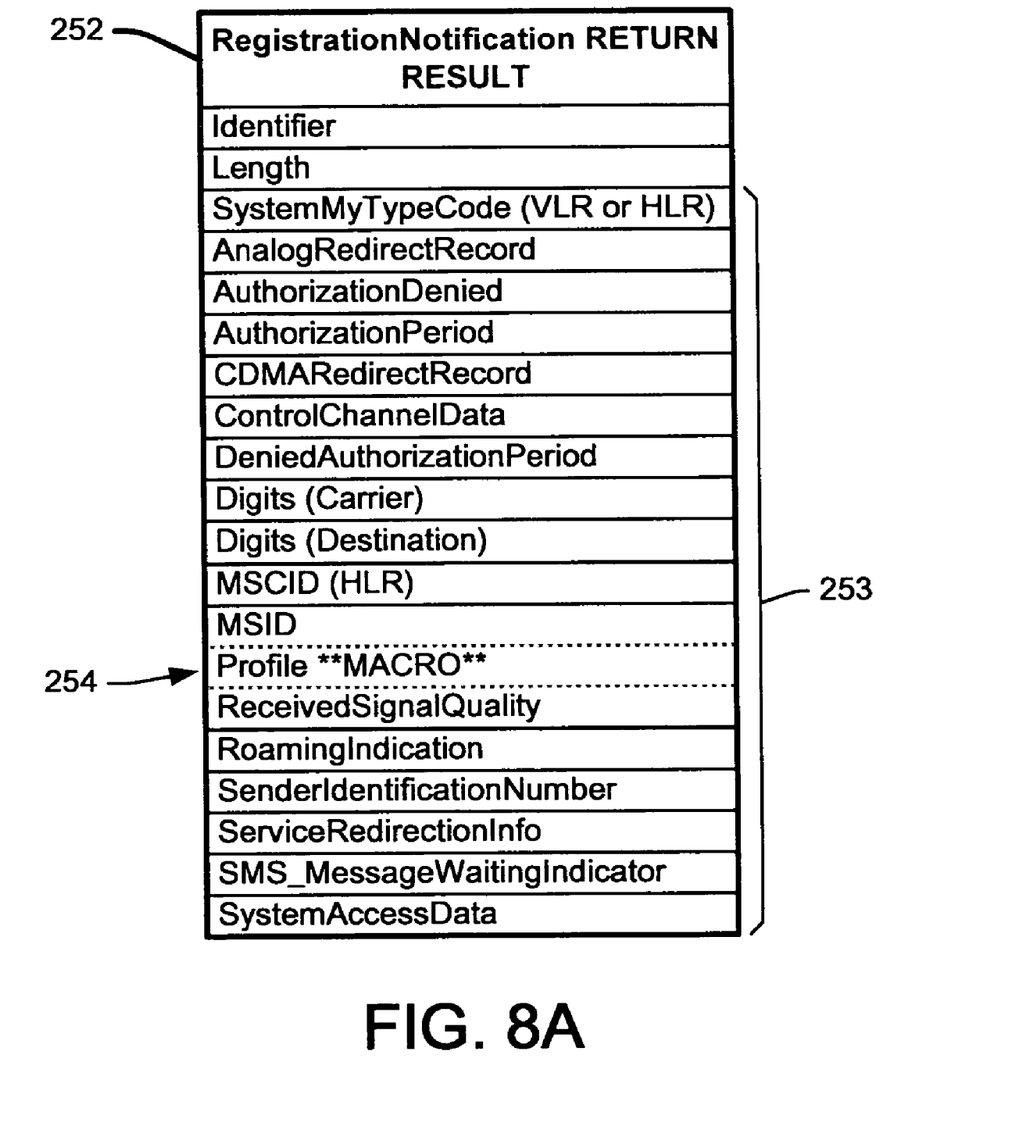
FIG. 8A is a schematic diagram illustrating an exemplary REGNOT return result message including a Profile field.
Figure 8B:
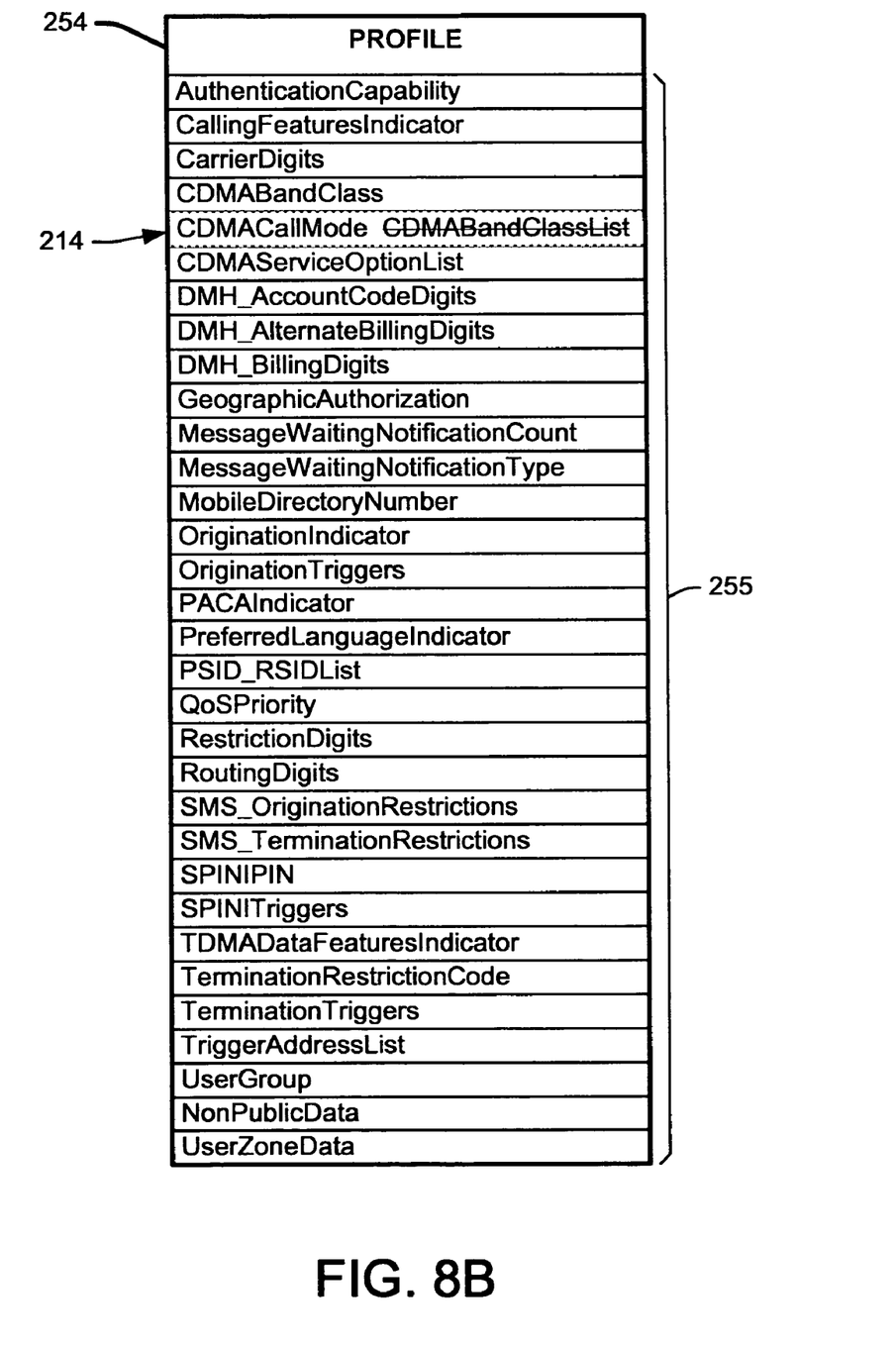
FIG. 8B is a schematic diagram illustrating the Profile field portion of the REGNOT return result message of FIG. 8A, including an exemplary CDMACallMode bandclass indicating field with individual bits indicating support for one or more bandclasses in accordance with the invention.

Referring also to FIGS. 8A and 8B, FIG. 8A shows one possible REGNOT return result message 252 having an identifier field and a length field, along with parameters 253, one of which is a Profile macro field 254. FIG. 8B illustrates an exemplary Profile field 254 having parameters 255 including a CDMACallMode parameter or field 214 (FIG. 4B above) with individual bits that indicate support by the mobile unit 120a' for a particular bandclass. Other bandclass indicating fields are possible within the scope of the invention, wherein the exemplary REGNOT return result message 252 and Profile macro field 254 thereof provide the CDMACallMode field in place of an omitted CDMABandClassList parameter.

Figure 9:
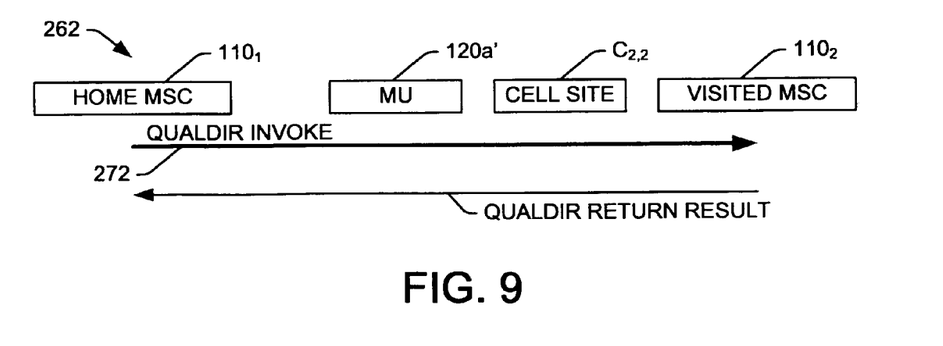
FIG. 9 is a simplified call flow diagram illustrating use of an exemplary QUALDIR invoke message to transfer bandclass information from a home MSC to a visited MSC according to the invention.
Figure 10:
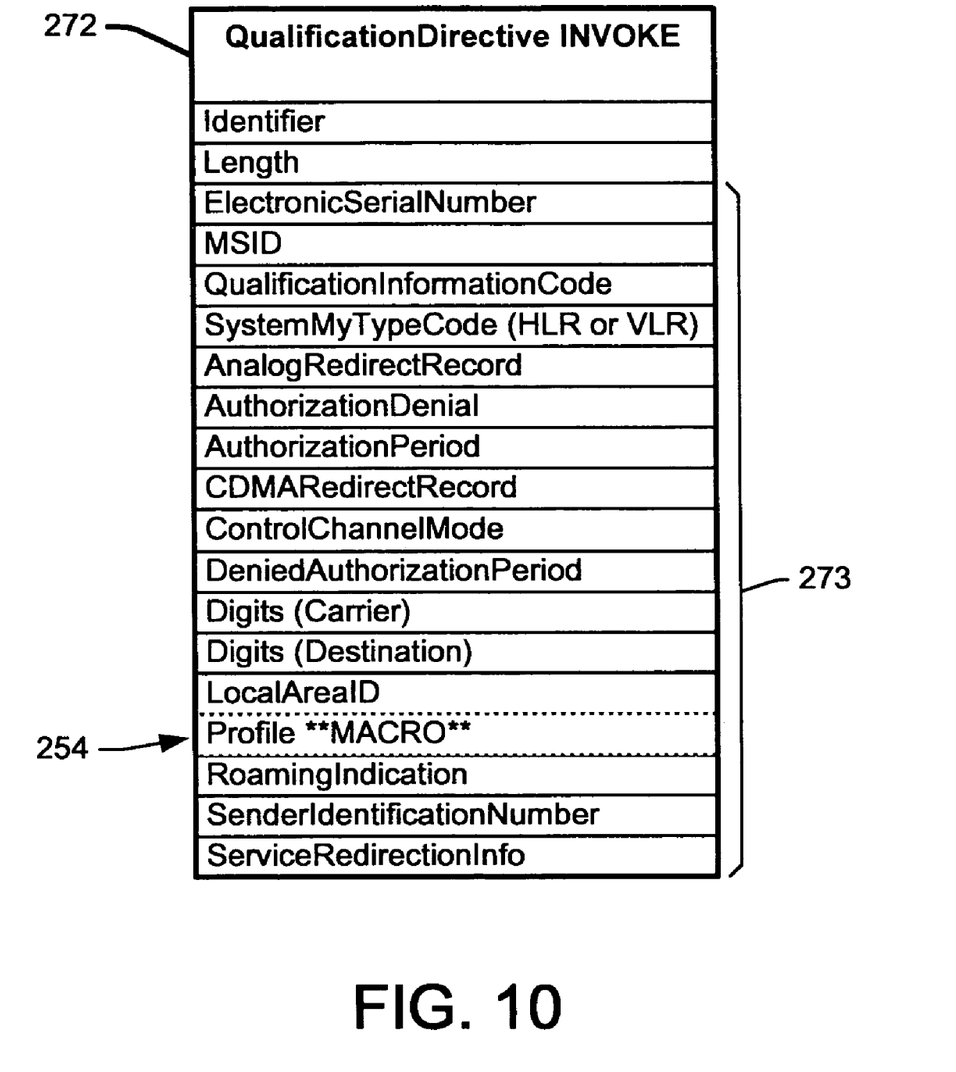
FIG. 10 is a schematic diagram illustrating an exemplary QUALDIR invoke message including a Profile field having a bandclass indicating field with individual bits indicating support for one or more bandclasses according to the invention.

Referring also to FIGS. 9 and 10, the invention also provides for efficient conveyance of bandclass information when previously obtained authorization and/or profile information is updated for a given roaming mobile communications unit 120a'. In the situation illustrated in FIG. 2B, for example, the mobile unit 120a' (in the location served by MSC 110$_2$) may be in use, with the subscriber engaged in a call while the supported bandclass information 116 or other profile information is updated by the home MSC 110$_1$ and/or the corresponding HLR $112_1$. FIG. 9 shows a simplified call flow 262 for this case, wherein the home MSC $110_1$ sends a QualificationDirective (QUALDIR) invoke message 272 to the visited MSC $110_2$ to update the profile information for the given unit $120a'$, including the bandclass information 116, which may then be stored in the VLR $114_2$ or otherwise maintained and used by the visited MSC $110_2$ to facilitate load balancing. An example of such a QUALDIR invoke message 272 is shown in FIG. 10, including identifier and length fields along with a list of parameters 273. These parameters 273 include a Profile macro field 254 having a CDMACallMode parameter or other bandclass indicating field 214 comprising a plurality of bits that individually indicate support for a particular bandclass by the unit $120a'$, as discussed above with respect to FIGS. 4B and 8B.

Although the invention has been illustrated and described with respect to one or more exemplary implementations or embodiments, equivalent alterations and modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The invention claimed is:

1. A method for efficiently conveying bandclass information between first and second switching modules for delivering or originating a call in a wireless communications system, the method comprising:
constructing a message in a first switching module;
providing a bandclass indicating field in the message, the bandclass indicating field comprising a plurality of bits individually indicating support for a particular bandclass by a given mobile communications unit; and
transmitting the message to a second switching module via a wireless communications network to facilitate delivery or origination of a call.

2. The method of claim 1, wherein the message is a RegistrationNotification (REGNOT) return result message, wherein the first switching module is a home switching module and the second switching module is a visited switching module, and wherein the home switching module transmits the message to the visited switching module to provide requested profile information for the given mobile communications unit in response to a RegistrationNotification (REGNOT) invoke message from the visited switching module.

3. The method of claim 1, wherein the message is a QualificationDirective (QUALDIR) invoke message, wherein the first switching module is a home switching module and the second switching module is a visited switching module, and wherein the home switching module transmits the message to the visited switching module to update profile information for the given mobile communications unit.

4. A method for efficiently conveying bandclass information between first and second switching modules for delivering or originating a call in a wireless communications system, the method comprising:
constructing a message in a first switching module;
providing a bandclass indicating field in the message, the bandclass indicating field comprising a plurality of bits individually indicating support for a particular bandclass by a given mobile communications unit; and
transmitting the message to a second switching module via a wireless communications network to facilitate delivery or origination of a call;
wherein the message is an InterSystemPage (ISPAGE) invoke or InterSystemPage2 (ISPAGE2) invoke message, wherein the first switching module is a serving or anchor switching module and the second switching module is a border switching module, and wherein the serving or anchor switching module transmits the message to the border switching module to request the border switching module to page the given mobile communications unit or to listen for a page response from the given mobile communications unit.

5. The method of claim 4, wherein the bandclass indicating field includes a CDMACallMode parameter.

6. The method of claim 5, wherein constructing the message comprises omitting a CDMABandClassList parameter from the message.

7. The method of claim 4, wherein constructing the message comprises omitting a CDMABandClassList parameter from the message.

8. A system for conveying bandclass information to a switching module for delivering or originating a call in a wireless communications system, comprising:
a first switching module comprising means for constructing a message, the message having a bandclass indicating field comprising a plurality of bits individually indicating support for a particular bandclass by a given mobile communications unit; and
means for transmitting the message to a destination switching module via the wireless communications network to facilitate delivery or origination of a call;
wherein the message is a InterSystemPage (ISPAGE) invoke or InterSystemPage2 (ISPAGE2) invoke message, wherein the first switching module is a serving or anchor switching module and the destination switching module is a border switching module, and wherein the serving or anchor switching module transmits the message to the border switching module to request the border switching module to page the given mobile communications unit or to listen for a page response from the given mobile communications unit.

9. The system of claim 8, wherein the bandclass indicating field includes a CDMACallMode parameter.

10. The system of claim 9, wherein the message is constructed by omitting a CDMABandClassList parameter from the message.

11. The system of claim 8, wherein the message is constructed by omitting a CDMABandClassList parameter from the message.

12. A method for efficiently transferring bandclass information between first and second switching modules using a non-handoff related message with a compact bandclass information field, the method comprising
constructing a non-handoff message in a first switching module;

providing a bandclass indicating field in the message with a plurality of bits individually indicating support for a particular bandclass by a given mobile communications unit; and sending the message to a second switching module via a wireless communications network;

wherein the message is a InterSystemPaqe (ISPAGE) invoke or InterSystemPage2 (ISPAGE2) invoke message, wherein the first switching module is a serving or anchor switching module and the destination switching module is a border switching module, and wherein the serving or anchor switching module transmits the message to the border switching module to request the border switching module to page the given mobile communications unit or to listen for a page response from the given mobile communications unit.

13. The method of claim 12, wherein the bandclass indicating field includes a CDMACallMode parameter.

14. The method of claim 13, wherein constructing the message comprises omitting a CDMABandClassList parameter from the message.

15. The method of claim 12, wherein constructing the message comprises omitting a CDMABandClassList parameter from the message.

* * * * *